United States Patent
Snyder

[15] 3,644,783
[45] Feb. 22, 1972

[54] DC DETECTION CIRCUIT
[72] Inventor: Carl R. Snyder, Alief, Tex.
[73] Assignee: Esquire, Inc.
[22] Filed: Aug. 18, 1969
[21] Appl. No.: 850,833

[52] U.S. Cl.................315/127, 315/86, 315/120,
    315/133, 315/136, 317/16, 317/31, 317/33 R
[51] Int. Cl.................................................H02h 3/20
[58] Field of Search...........315/86, 88, 91, 92, 93, 119,
    315/120, 127, 129, 136, 130, 132, 133, 135;
    317/16, 31, 33 R, 52

[56] References Cited

UNITED STATES PATENTS 3,294,977  12/1966  Duncan.................................315/86 X
3,475,653  10/1969  Odenberg et al....................317/31 X
3,517,254  6/1970  McNamara et al..................317/31 X

*Primary Examiner*—Raymond F. Hossfeld
*Attorney*—Arnold, White and Durkee, Tom Arnold, Walter Kruger, Bill Durkee, Frank S. Vaden, III, Louis T. Pirkey and Stanley A. Becker

[57] ABSTRACT

A DC detection circuit in an AC power circuit for detecting DC and for protecting AC loads from the deleterious application of a DC current. The DC detection circuit is particularly applicable to an emergency lighting system having both AC and DC power sources and AC and DC lighting facilities for detecting the application of DC and for disconnecting the AC lighting facilities to prevent their damage and for lighting the DC lighting facilities.

4 Claims, 6 Drawing Figures

PATENTED FEB 22 1972
3,644,783
SHEET 1 OF 2
FIG. 1
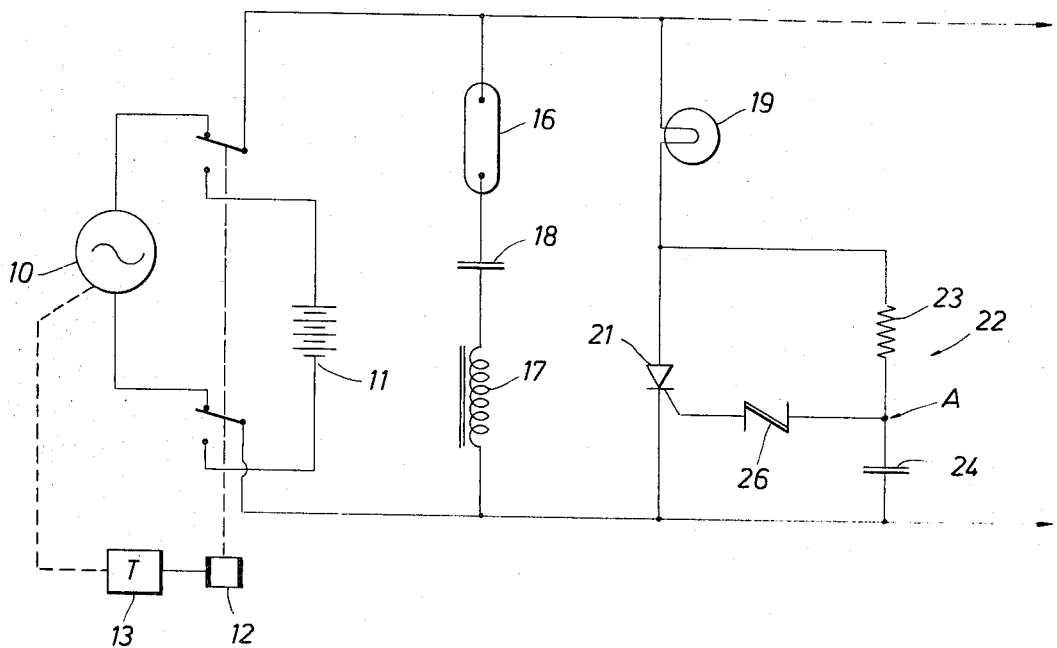
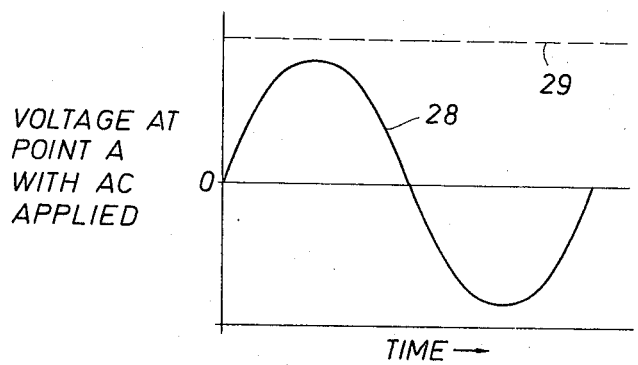
FIG. 2
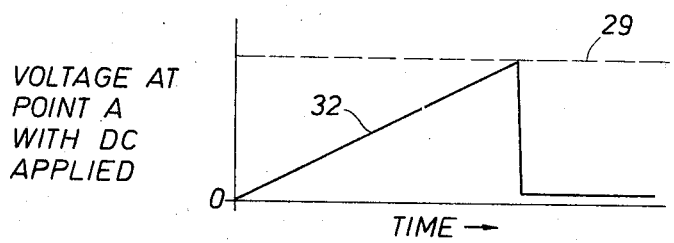
FIG. 3
Carl R. Snyder
INVENTOR
BY Arnold, Roylance,
Kruger & Durkee
ATTORNEYS Carl R. Snyder
INVENTOR BY Arnold, Roylance,
Kruger & Durkee
ATTORNEYS 3,644,783

DC DETECTION CIRCUIT

BACKGROUND OF THE INVENTION

This invention relates to a circuit for detecting DC in an AC power circuit. In AC power circuits and other circuits having AC loads and rectified loads therein, a load or component may fail causing a DC current drain and consequently a DC potential to be applied. Many AC loads can be severely damaged by DC current. Hence, it is desirable to be able to detect the presence of DC in an AC system to prevent any deleterious effects on the components of the system.

Additionally, in a system having both AC and DC sources, and AC and DC loads, either of which sources may be selectively applied, it is desirable to have facilities for detecting the application of the DC source to protect the AC load, and likewise to protect the DC load when the AC source is applied.

For example, consider an emergency or continuous lighting system having both an AC and a DC source. The AC source lights a gaseous-discharge lamp. However, in the event of failure of the AC source, a DC source is provided to light incandescent lights to provide continuous lighting. Two separate circuits can be provided, however, this is not the most efficient or economical solution. It is advantageous to incorporate the AC and DC sources and the gaseous-discharge lamp and incandescent lights in one circuit. However, facilities must be provided to detect when the DC source is applied to prevent damage to the gaseous-discharge lamp. Also, the facilities must prevent AC from being applied to the incandescent lights so that the incandescent lights are extinguished when the gaseous-discharge lamp is lit. This invention is particularly applicable to this continuous lighting system.

SUMMARY OF THE INVENTION

The DC detection circuit utilizes facilities which are responsive to a DC voltage for preventing damage to the components of an AC power circuit. Specifically the circuit includes a gated unilateral switch which is connected across at least one of the AC loads in the AC power circuit. An integrator circuit having an input and an output is connected across the unilateral switch. A trigger switch, which fires at a predetermined threshold voltage, connects the gate of the unilateral switch with the output of the integrator. The threshold of the trigger switch is selected so that when AC voltage is applied to the power circuit, the threshold is not reached and the trigger switch does not fire. But, when DC voltage is applied, the output of the integrator circuit rises until the threshold voltage is reached thereby firing the trigger switch. The trigger switch applies a gating voltage to the gated unilateral switch which conducts and disconnects the AC loads from the circuit thereby preventing their damage by the DC voltage.

The DC detection circuit is particularly applicable to a continuous lighting system having both AC lighting facilities and DC lighting facilities. The AC lighting facilities ordinarily include an AC source, a ballast and a gaseous-discharge lamp. The DC lighting facilities ordinarily include a DC source and one or more incandescent lights. The continuous lighting system is useful in many applications wherein it is necessary that an area be lighted at all times. Such applications, for example, include industrial lighting, parking lots, and dangerous areas such as stairs and walkways. When a gaseous-discharge lamp is extinguished for any reason, such as a failure of the lamp or a power failure, other facilities must quickly operate to provide light to these critical areas.

Accordingly, a system is provided having AC and DC lighting facilities. Transfer or switching facilities are provided to either automatically or manually switch from the AC power source to the DC power source when there is an AC power failure, or when the gaseous-discharge lamp fails. At this time, the DC detecting circuit operates to connect the incandescent light to the DC source to provide light. Additionally, facilities are provided to prevent the DC from being applied to the gaseous-discharge lamp. When the AC power is restored or when the gaseous-discharge lamp is replaced, the transfer facilities can be reset to again apply the AC power source to the system. At this point, the incandescent lights are extinguished and the gaseous-discharge lamp may be reignited.

BRIEF DESCRIPTION OF THE DRAWINGS

FIG. 1 is a detailed circuit diagram of a continuous lighting system having an AC and a DC source, including a DC detector circuit which embodies the principles of the present invention.

FIG. 2 is a wave diagram of the voltage at point A of the FIG. 1 circuit when AC is applied, as it varies with time.

FIG. 3 is a wave diagram of the voltage at point A of the FIG. 1 circuit when DC is applied, as it varies with time.

DESCRIPTION OF THE INVENTION

Figure 4:
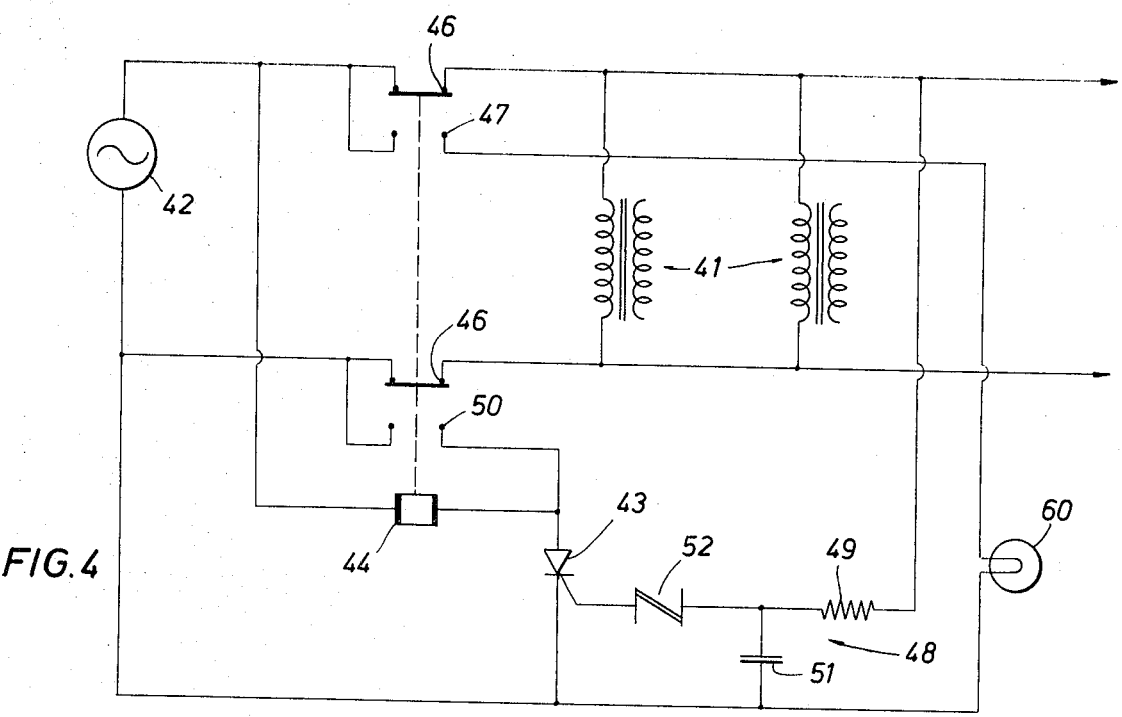
FIG. 4 is an alternative embodiment of another circuit which utilizes the DC detection circuit to prevent damage to the AC loads.

Referring to FIG. 1, there is shown a detailed circuit diagram including an AC power source 10 and a DC power source 11. Switching facilities generally designated as 12 are provided for connecting either the AC power source 10 or the DC power source 11 to the circuit. The switching facilities 12 may be manual or automatic. The automatic facilities, for example, may include a conventional timing circuit, generally designated as 13, which in response to a failure of the AC source 10 will automatically switch the associated contacts to connect the DC source 11 to the circuit. The automatic switching facilities is a device known to be of a conventional nature in the prior art. For example, a time delay relay operating upon deenergization as manufactured by Agastat Division of Elastic Stop Nut Corporation of America, 1027 Newark Avenue, Elizabeth, New Jersey 07207, will perform the function of timing circuit 13 and switching facility 12. Also, automatic transfer switch option A-3 shown in Bulletin 1270, dated Jan. 1964, Allen-Bradley Company, 1201 South Second Street, Milwaukee, Wisconsin 53204 will perform the described function.

A gaseous-discharge lamp 16 is connected across the sources of power 10 or 11. In series with the gaseous-discharge lamp 16 are an inductive ballast designated as 17 and a capacitor 18. The ballast is a current limiting device which is necessary to prevent destruction of the gaseous-discharge lamp once the lamp is ignited. Connected in parallel with the gaseous-discharge lamp 16 is an incandescent light 19. An SCR 21 is connected in series with the incandescent light 19. An integrator circuit generally designated as 22 and consisting of a series combination of a resistor 23 and a capacitor 24 has an input connected to the voltage source 10 and an output connected to a trigger switch 26 which is connected to the gate electrode of the SCR 21. While only one gaseous-discharge lamp 16 and one incandescent light 19 is shown in FIG. 1, it is to be noted that a plurality of parallel combinations of the gaseous-discharge lamps and incandescent lights may be utilized in this circuit, all of which use the same power sources.

Referring now to FIG. 2 there is shown a graphic representation of the AC voltage 28 at point A in FIG. 1 as it varies with time. The threshold voltage of the trigger switch 26 is designated by the dotted line 29. The values of the resistor 23 and the capacitor 24 are such that the voltage at point A never reaches the threshold 29 of switch 26 when AC voltage is applied thereto. Consequently, switch 26 is not fired, thereby keeping the SCR 21 turned off so that no power is applied to the incandescent light 19. When an AC power failure occurs, the switching facilities 12 will switch from the AC power source 10 to the DC power source 11.

FIG. 3 shows how the DC voltage 32 at point A varies with time. As soon as the DC power is applied, a charge builds up on capacitor 24, as indicated by line 32, until it reaches the threshold level 29. At this point, switch 26 conducts and a gating voltage is applied to the SCR 21 rendering it conductive. Once the SCR 21 is turned on, it remains on until the DC power is removed. The capacitor 18 effectively blocks the DC voltage in order to prevent damage to the gaseous-discharge lamp 16.

In operation, assume that the switching facilities 12 are connected to the AC power source 10 and that the gaseous-discharge lamp 16 is ignited and lit. The incandescent light 19 is extinguished since the AC voltage 28 is insufficient to trigger the trigger switch 26 so that the SCR 21 remains turned off. When there is an AC power failure, the switching facilities 12 either automatically or manually connect the DC power source 11 to the circuit. After the DC voltage is applied to the circuit, the threshold of switch 26 is very quickly reached, as shown in FIG. 3, and switch 26 is triggered thereby applying a gating voltage to the SCR 21 rendering it conductive. When the SCR 21 conducts, the DC voltage is applied across the incandescent light 19 to provide light therefrom until the AC power can be restored. When the AC power is restored, the switching facilities 12 can be moved to disconnect the DC power source 11 and once again reconnect the AC power source 10. At this point, the SCR 21 turns off and the incandescent light 19 is extinguished. Once the AC power source 10 is re-applied, the gaseous-discharge lamp 16 will re-ignite and provide the necessary lighting.

While the foregoing description has referred to the gaseous-discharge lamp 16 and the incandescent light 19 as the AC and DC loads, respectively, it is to be understood that the circuit can be utilized with any AC load, such as an AC motor, in place of the gaseous-discharge lamp 16, and any DC load, such as a DC motor, in place of the incandescent light 19.

FIG. 4 shows an alternative embodiment of the DC detecting circuit which is utilized to detect the presence of DC on an AC line to prevent the failure or destruction of AC components which can be deleteriously affected by DC current. The circuit includes a plurality of AC loads 41 which are connected across an AC source 42. The AC loads 41 can be inductive devices such as transformers which have a very low DC resistance. Consequently, a small DC voltage applied thereto causes relatively high DC currents to flow through the coils which in turn causes overheating and eventual failure. A relay 44 is connected in series with an SCR 43. The series combination of SCR 43 and relay 44 is connected across the AC source 42. When an AC voltage is applied, relay 44 has normally closed contacts 46 positioned in the AC lines and normally open contact 50 positioned across SCR 43. Additionally relay 44 may if desired have a normally open contact 47 which when closed provides either a visual or audible signal indicating that the AC power has been disconnected. An integrator circuit, generally designated as 48, including a series combination of a resistor 49 and a capacitor 51, has an input connected to the AC source 42 and an output connected to a unilateral switch 52. The unilateral switch 52 is connected to the gate electrode of the SCR 43.

In normal operation, the AC source is applied to the AC loads 41 and relay contacts 46 remain closed. The values of the resistor 49 and the capacitor 51 are selected such that the AC voltage is insufficient to reach the threshold voltage of the unilateral switch 52 as shown in FIG. 2. When a DC voltage is detected on the AC lines, capacitor 51 charges up until the threshold of the unilateral switch 52 is reached, whereupon the SCR 43 is triggered energizing relay 44 which closes contact 50 to latch in relay 44 and opens contacts 46 to disconnect the AC loads 41 from the source 42. The circuit of FIG. 4 functions differently from the circuit in FIG. 1 in that this circuit disconnects the AC load from the lines when there is DC voltage superimposed on the lines with the AC voltage–not when there is an absence of AC voltage. When the DC voltage gates on SCR 43 via the integrator and unilateral switch action, the initial presentation of DC voltage appears as AC to relay 44 to cause the initial closure of contacts 50. Contacts 50 stay latched in since AC voltage from source 42 is now applied across the coil of relay 44 through contracts 50. An example of a relay suitable for operation in the manner just described is Allen-Bradley Company control relay, Catalog No. 700C220A found in Allen-Bradley Company Bulletin No. 700—AC dated January 1965. Additionally, if signalling contacts 47 are closed so that a visual or audible signal, such as a flashing red light 60 or a buzzer, or both, notifies an operator that the AC source has been disconnected.

Figure 5:
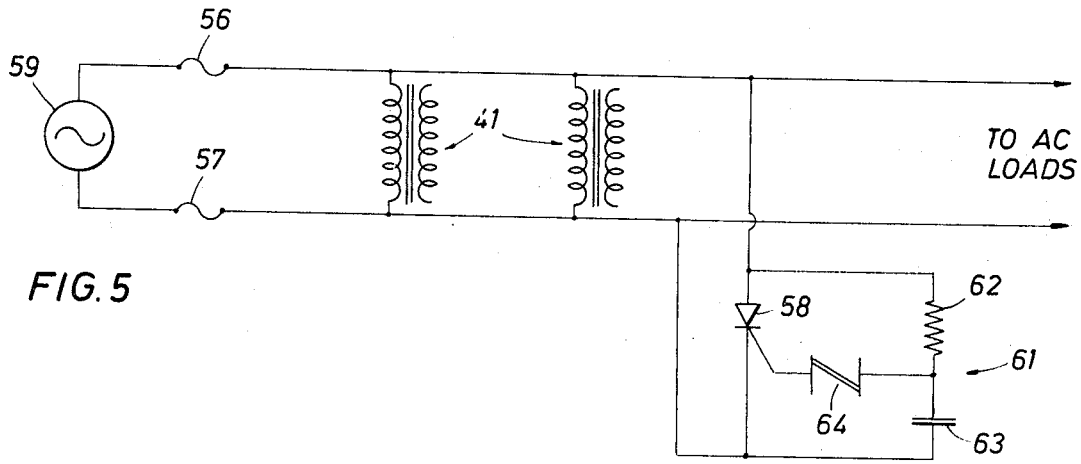
FIG. 5 is another embodiment of a circuit which utilizes the DC detector circuit to prevent damage to AC loads.

FIG. 5 shows another alternative embodiment having fuses or circuit breakers 56 and 57 in the AC lines. An SCR 58 is connected across the AC source 59. An integrator circuit 61, including a series combination of a resistor 62 and a capacitor 63, has an output connected to a unilateral switch 64 which is connected to the gate electrode of the SCR 58. In normal AC operation, the threshold voltage of switch 64 is not reached. However, when DC is detected, the voltage builds up until the switch 64 is triggered firing the SCR 58. When SCR 58 conducts, a short circuit is provided across the AC source 59 and fuses 56 and 57 blow, thereby preventing any damage to the AC loads 41.

Figure 6:
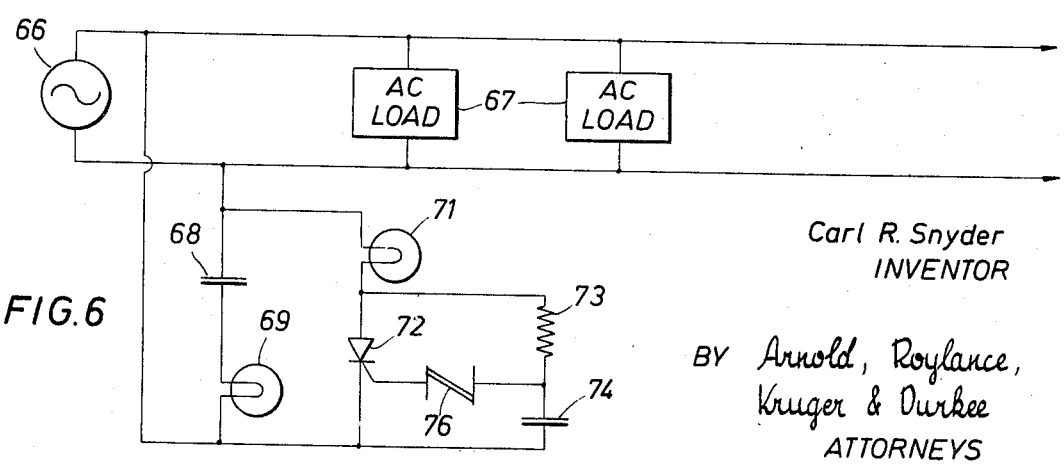
FIG. 6 is still another embodiment of a circuit utilizing the principles of the present invention to provide signalling facilities to indicate when DC is detected on the power line.

Referring to FIG. 6, there is shown another alternative embodiment wherein the DC detecting circuit is utilized as a signalling circuit to indicate the presence of either AC or DC levels. The circuit includes an AC source 66 and a plurality of AC loads 67. A series combination of a capacitor 68 and an AC signalling device, such as a lamp 69, is connected across the AC source 66. Another series combination consisting of a DC signalling device, such as a lamp 71, and an SCR 72 is connected in parallel with the capacitor 68 and lamp 69. An integrator circuit including a resistor 73 and a capacitor 74 has an input connected to the AC source and an output connected to a unilateral switch 76 which is connected to the gate electrode of the SCR 72. When AC is applied, the lamp 69 is lit, however, the values of resistor 73 and capacitor 74 are selected such that the AC voltage is insufficient to fire switch 76. Thus, lamp 71 is extinguished. When DC is detected, a charge builds up on capacitor 74 and, when the threshold of switch 76 is reached, the switch triggers, firing SCR 72 and lighting the DC indicating lamp 71.

It is to be understood that the above-described embodiments are merely illustrative of some applications of the principles of this invention and that numerous other arrangements and modifications may be made within the spirit and scope of the invention.

What is claimed is:

1. In an AC power circuit having at least one AC load connected to an AC power source, said AC load capable of being deleteriously affected by the application of a DC voltage thereto, a DC detecting circuit comprising:
    gated switch means connected across said AC load;
    integrator circuit means having an input connected to said AC voltage source and an output;
    trigger means responsive to the output of said integrator circuit indicating the application of a DC power for applying a gating voltage to said gated switch means; and
    means responsive to the conduction of said gated switch means for disconnecting said AC load from said AC source.

2. A DC detecting circuit as described in claim 1, wherein,
    said integrator circuit means includes a series combination of a resistance and a capacitance, and
    said trigger means has a threshold voltage level greater than the maximum voltage of said AC source, said trigger means connected between the gate of said gated switch means and the juncture of said resistance and said capacitance.

3. A DC detecting circuit as described in claim 1, wherein said disconnecting means includes:
    fuse means which are responsive to the conduction of said gated switch means for disconnecting said AC load from said AC source.

4. In an AC power circuit having at least one AC load connected to an AC power source, said AC load capable of being deleteriously affected by the application of a DC voltage thereto, an AC/DC signalling circuit comprising:

AC signalling means connected across said AC load for indicating the presence of an AC voltage, a series combination of DC signalling means and gated switch means, said series combination connected across said AC load;

integrator circuit means having an input connected to said AC source and an output; and trigger means responsive to said output of said integrator circuit indicating the application of a DC voltage for applying a gating voltage to said gated switch means to energize said DC signalling means (and means responsive to the application of a DC voltage for deenergizing said AC signalling means).

* * * * *